(12) United States Patent
Sevenhuijsen et al.

(10) Patent No.: US 7,018,436 B2
(45) Date of Patent: Mar. 28, 2006

(54) CATALYTIC REACTOR WITH TANGENTIAL FLOW DISTRIBUTION

(75) Inventors: Eric Sevenhuijsen, Amsterdam (NL); Hendrik Martinus Wentinck, Amsterdam (NL)

(73) Assignee: Shell Oil Company, Houston, TX (US)

( * ) Notice: Subject to any disclaimer, the term of this patent is extended or adjusted under 35 U.S.C. 154(b) by 384 days.

(21) Appl. No.: 10/344,195

(22) PCT Filed: Aug. 6, 2001

(86) PCT No.: PCT/EP01/09101

§ 371 (c)(1),
(2), (4) Date: Feb. 7, 2003

(87) PCT Pub. No.: WO02/11878

PCT Pub. Date: Feb. 14, 2002

(65) Prior Publication Data

US 2003/0170155 A1  Sep. 11, 2003

(30) Foreign Application Priority Data

Aug. 8, 2000 (EP) .................................. 00306740

(51) Int. Cl.
 *C10J 3/00* (2006.01)
 *C10J 3/46* (2006.01)
(52) U.S. Cl. ............... 48/214 A; 48/198.6; 48/197 R; 48/127.7; 422/211; 422/220; 422/222; 422/225; 422/229
(58) Field of Classification Search .......... 48/197 R, 48/198.6, 214 A, 127.7; 422/211, 220, 222, 422/225, 228, 229
See application file for complete search history.

(56) References Cited

U.S. PATENT DOCUMENTS

| | | | |
|---|---|---|---|
| 5,779,773 A | | 7/1998 | Cam et al. |
| 5,873,929 A | | 2/1999 | Andreani et al. |
| 5,939,025 A | * | 8/1999 | Ahmed et al. ............... 422/111 |
| 6,180,068 B1 | * | 1/2001 | Boyd et al. .................. 422/195 |
| 6,183,702 B1 | * | 2/2001 | Nguyen et al. .............. 422/194 |
| 6,244,367 B1 | * | 6/2001 | Ahmed et al. .............. 180/65.1 |
| 6,620,389 B1 | * | 9/2003 | Lesieur ....................... 422/220 |
| 6,863,867 B1 | * | 3/2005 | Vanden Bussche et al. . 422/129 |
| 2002/0192154 A1 | * | 12/2002 | Kramer et al. .............. 423/651 |

FOREIGN PATENT DOCUMENTS

| | | |
|---|---|---|
| DE | 234562 A3 | 4/1986 |
| DE | 4303471 | 8/1994 |
| EP | 0 303 439 | 2/1989 |
| EP | 0 463 247 A1 | 1/1992 |
| FR | 1177434 | 4/1959 |
| WO | 98/30322 | 7/1998 |
| WO | 98/49095 | 11/1998 |

\* cited by examiner

*Primary Examiner*—N. Bhat

(57) ABSTRACT

A reactor with a catalyst bed having a central longitudinal axis, which catalyst bed has an upstream surface perpendicular to the central longitudinal axis, and a distribution chamber for directing a gaseous mixture of reactants to the upstream surface of the catalyst bed, which distribution chamber has an inlet for tangentially introducing the mixture into the distribution chamber, the distribution chamber being defined by the upstream surface of the catalyst bed, a side surface having a central longitudinal axis that coincides with the central longitudinal axis of the catalyst bed, and a covering surface formed such that the distance between the upstream surface of the catalyst bed and the covering surface is monotonically decreasing towards the central longitudinal axis. The invention further relates to a fuel cell system having such a reactor and a fuel cell and to a process for the catalytic oxidation of a hydrocarbonaceous fuel using such a reactor.

24 Claims, 2 Drawing Sheets

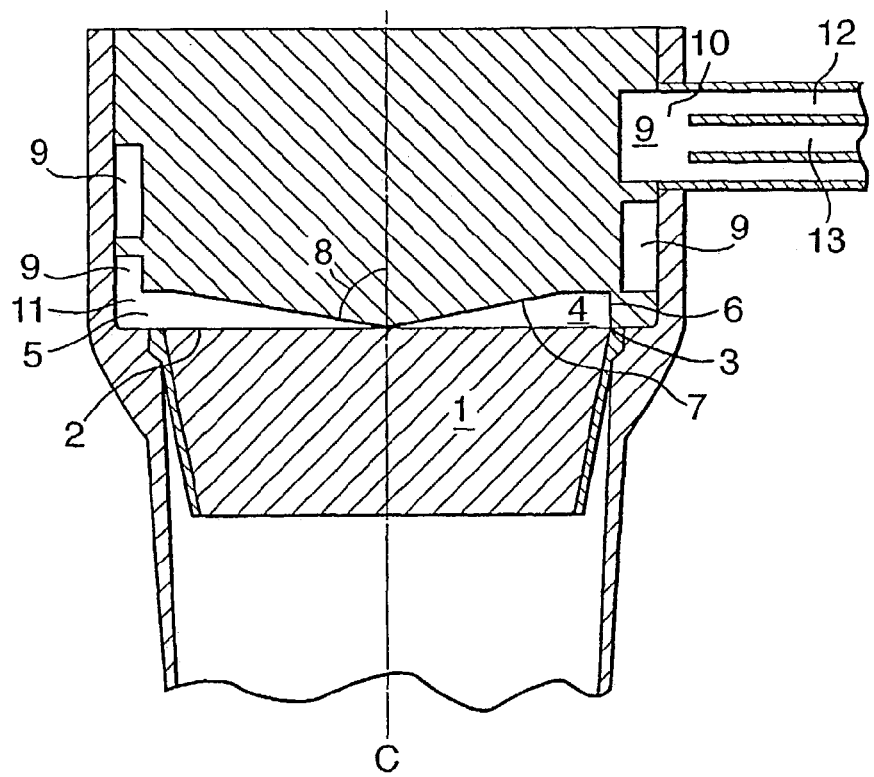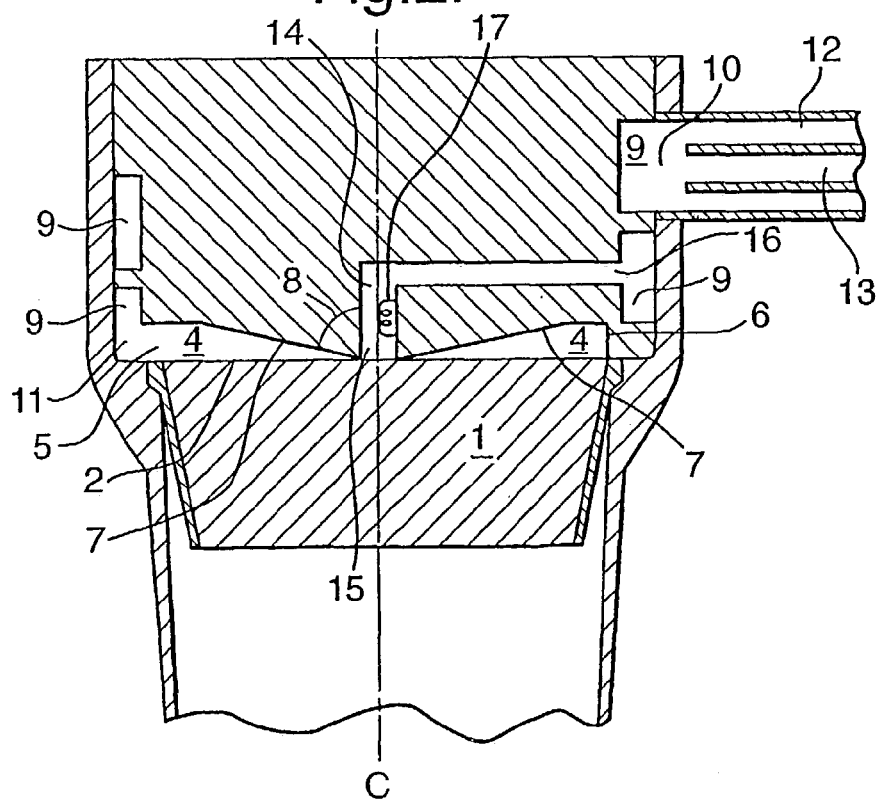

CATALYTIC REACTOR WITH TANGENTIAL FLOW DISTRIBUTION

FIELD OF THE INVENTION

The present invention relates to a reactor comprising a catalyst bed and a distribution chamber for directing a gaseous mixture of reactants to the upstream surface of the catalyst bed, a fuel cell system comprising such a reactor, and to a process for the catalytic oxidation of a hydrocarbonaceous fuel using such a reactor.

BACKGROUND OF THE INVENTION

In many conversion processes, reactants are mixed to obtain a gaseous mixture that is contacted with a catalyst bed. For optimal mixing, it is advantageous to use a mixing zone with a relatively large ratio of length to diameter. Therefore, the cross-sectional area of the mixing zone is generally smaller than that of the catalyst bed with which the mixture is to be contacted. In order to distribute the mixture evenly over the upstream surface of the catalyst bed, either a plurality of mixers can be used or the mixture has to be spread over the upstream surface of the catalyst bed.

If the reactants form a mixture that is susceptible to ignition or explosion, such as is the case in processes for oxidation of a hydrocarbonaceous fuel wherein a mixture of hydrocarbonaceous fuel and a molecular oxygen containing gas is contacted with a catalyst, it is important that variations in the residence time of the mixture in the zone upstream of the catalyst are minimal. Zones wherein the flow of the feed mixture is stagnant are to be avoided. Reference herein to zones wherein the flow is stagnant is to zones wherein the residence time of the mixture is relatively long as compared to the average residence time of the mixture.

In EP 303 439, a gas mixer and distributor for feeding a gaseous reaction mixture to a catalytic partial oxidation reaction zone is disclosed. The disclosed gas mixer and distributor comprises a plurality of small mixing tubes opening above a larger catalytic reaction zone.

In WO 98/49095 is disclosed an injector/reactor apparatus for the catalytic partial oxidation of light hydrocarbons comprising a manifold of mixing nozzles upstream of a larger catalytic partial oxidation zone.

In WO 98/30322, a catalytic reactor for partial oxidation of a hydrocarbonaceous feedstock comprising a mixer-diffuser for mixing a hydrocarbonaceous feedstock and an oxygen-containing gas and subsequently spreading it over the catalyst surface is disclosed. In the disclosed mixer-diffuser, the mixture is first expanded in an annular chamber by increasing the diameter of the annular flow path of the mixture without increasing the available cross-sectional area of the flow path, the expanded mixture is then supplied via an annular inlet to a distribution chamber. A disadvantage of the mixer-diffuser of WO 98/30322 is that the mixture is axially supplied to the expander/diffuser, thereby requiring a relatively high mixing chamber.

SUMMARY OF THE INVENTION

It has now been found that a gaseous mixture of reactants can advantageously be spread over the upstream surface of a catalyst bed by using a reactor wherein the mixture is tangentially introduced into a distribution chamber of which the height is monotonically decreasing towards the central longitudinal axis of the catalyst bed.

Accordingly, the present invention relates to a reactor comprising a catalyst bed having a central longitudinal axis, which catalyst bed has an upstream surface perpendicular to the central longitudinal axis, and a distribution chamber for directing a gaseous mixture of reactants to the upstream surface of the catalyst bed, which distribution chamber has an inlet for tangentially introducing the mixture into the distribution chamber, the distribution chamber being defined by the upstream surface of the catalyst bed, a side surface having a central longitudinal axis that coincides with the central longitudinal axis of the catalyst bed, and a covering surface formed such that the distance between the upstream surface of the catalyst bed and the covering surface is monotonically decreasing towards the central longitudinal axis.

DESCRIPTION OF THE DRAWINGS

The reactor according to the invention will now be further illustrated by way of example with reference to FIGS. 1 to 3.

FIG. 1 shows a longitudinal section of the catalyst bed and distribution chamber of a first embodiment of the reactor according to the invention.

FIG. 2 shows a longitudinal section of the catalyst bed and distribution chamber of a second embodiment of the reactor according to the invention.

DESCRIPTION OF THE INVENTION

Figure 3:
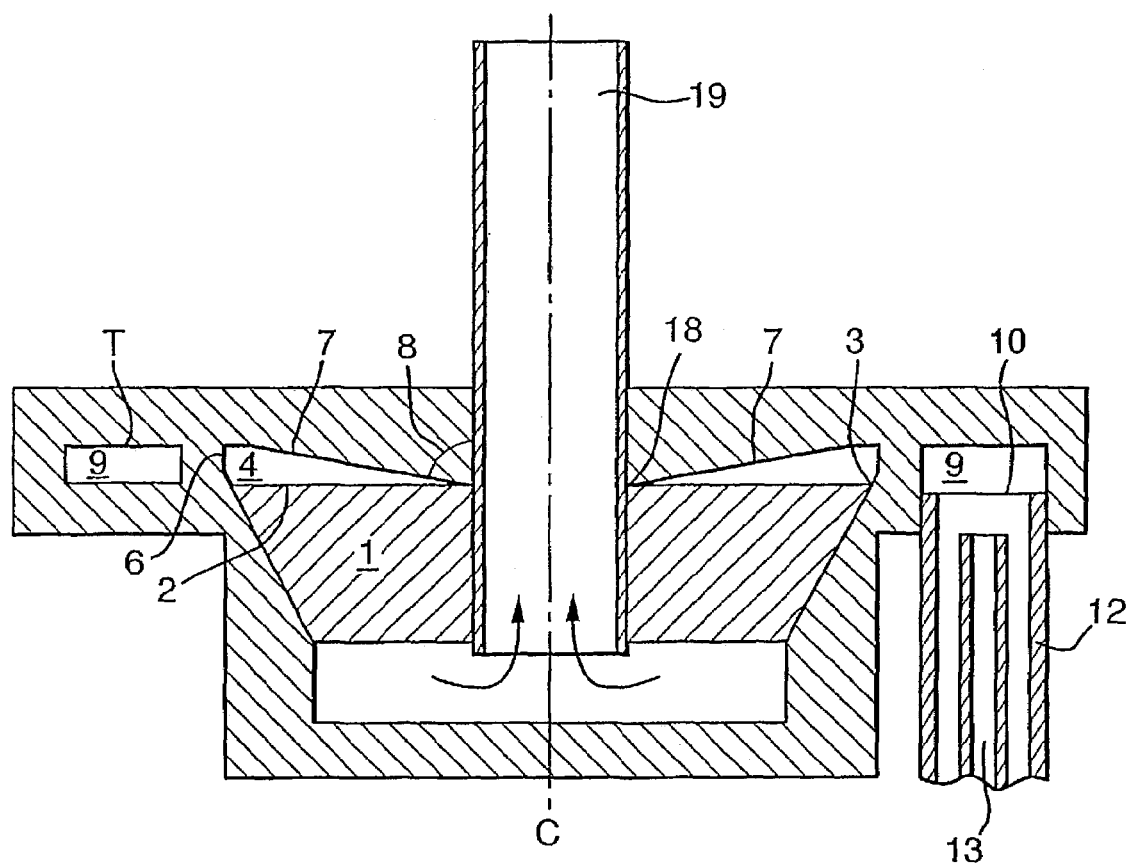
FIG. 3 shows a longitudinal section of the catalyst bed and distribution chamber of a third embodiment of the reactor according to the invention.

An advantage of the reactor according to the invention is that, during normal operation, the gaseous mixture of reactants flows in a swirling movement, tangentially with respect to the upstream surface of the catalyst, resulting in relatively high strain rates or turbulence such that the risk of flame propagation is low. The monotonically decreasing height of the distribution chamber minimises the occurrence of recirculation of the mixture away from the catalyst surface in the centre of the swirl movement. Another advantage of the reactor according to the invention is that it is suitable to comprise a mixer having a spiral mixing chamber, such that the required length of the mixing chamber may be achieved without the need for a high mixer, resulting in a compact reactor.

In FIG. 1 is shown a catalyst bed 1 in the form of a frusto-conically shaped, ceramic foam, having a central longitudinal axis C and having its upstream surface 2 perpendicular to the central longitudinal axis C. The upstream surface 2 has a circular outer perimeter 3. Upstream of the catalyst bed 1, the reactor has a distribution chamber 4 for directing a mixture of reactants to the catalyst bed 1.

The distribution chamber 4 has an inlet 5 for tangentially introducing the mixture of reactants into chamber 2. The distribution chamber 4 is defined by the upstream surface 2 of catalyst bed 1, side surface 6, and covering surface 7. The covering surface 7 has a shape such that the height of chamber 4, i.e. the distance between the upstream surface 2 of catalyst bed 1 and the covering surface 7, is monotonically decreasing towards the central longitudinal axis C of catalyst bed 1.

The covering surface 7 can be made of a high-temperature resistant material, preferably a high-alloy steel or a refractory oxide. Part of the covering surface 7 has a conical shape having a half cone angle 8.

The reactor in FIG. 1 further comprises a helically-wound spiral mixing channel 9, having an inlet 10 for the reactants to be mixed and an outlet 11 for the mixture of reactants. The inlet 10 is in fluid communication with inlet conduits 12 and 13. Alternatively, channel 9 may have separate inlets, each in fluid communication with a single inlet conduit. The outlet 11 is in fluid communication with the inlet 5 of the distribution chamber 4. The channel 9 may be provided with obstacles (not shown) to promote mixing.

The reactor shown in FIG. 2 comprises an inlet channel 14 for supplying part of the mixture of reactants to the upstream surface 2 of the catalyst bed 1, the inlet channel 14 having an outlet 15 opening into the covering surface 7. Part of the mixture of reactants is fed to the inlet channel 14 via inlet 16. In the embodiment shown in FIG. 2, inlet 16 is in fluid communication with the mixing channel 9.

Preferably, inlet channel 14 contains an igniter 17 for igniting the mixture during start-up of the reactor. Suitable igniters are known in the art.

In the embodiment of the reactor shown in FIG. 3, the catalyst bed 1 is an annular catalyst having an upstream surface 2 with an outer perimeter 3 and an inner perimeter 18. The reactor of FIG. 3 further comprises a conduit 19 for removal of the effluent of the catalyst bed 1. The annular catalyst bed 1 is arranged around conduit 19. This embodiment is advantageous in situations wherein it is desired to supply the feed mixture and remove the effluent of catalyst bed 1 at the same side of the catalyst bed 1.

Part of the covering surface 7 has a frusto-conical shape having a half cone angle 8.

The reactor in FIG. 3 comprises a circularly-wound spiral mixing channel 9.

In order to create a tangentially flowing feed mixture in the reactor according to the invention, the inlet 5 for introducing the mixture into distribution chamber 4 is preferably located in side surface 6.

The upstream surface 2 preferably has a circular or oval outer perimeter 3, preferably a circular outer perimeter. Alternatively, the outer perimeter 3 of the upstream surface 2 is a polygonal having more than four angles.

If the catalyst bed 1 is an annular catalyst bed, the distribution chamber 4 is an annular chamber. Since in such a chamber the space in the centre of the swirl movement is not available to the gaseous mixture flowing in the chamber, there is no need for a monotonically increasing height in order to prevent recirculation in the centre of the swirl movement. Therefore, the height of the distribution chamber 4, i.e. the distance between the upstream surface 2 and the covering surface 7, may be constant in the case of an annular catalyst bed.

Preferably, at least part of the covering surface 7 has a conical shape, such as shown in FIG. 1, or, in the case of an annular catalyst bed 1, as illustrated in FIG. 3, a frusto-conical shape. The half cone angle 8 is preferably larger than 45°, more preferably larger than 60°, even more preferably larger than 75°. A conically of frusto-conically shaped covering surface 7 with a relatively large half cone angle minimises the occurrence of dead spaces in the distribution chamber 4 and limits the height of the chamber 4 at the outer perimeter 3 as compared to the diameter of the upstream surface 2.

Preferably, the diameter of the upstream surface 2 is at least 5 times the largest height of the distribution chamber 4, i.e. the distance between the upstream surface 2 and the covering surface 7 at the outer perimeter 3. More preferably, the diameter of the upstream surface 2 is at least 10 times the largest height of chamber 4, even more preferably at least 15 times. By limiting the height of the distribution chamber, a sufficient high flow velocity component parallel to the catalyst surface can be maintained. If the upstream surface does not have a circular outer perimeter, reference to the diameter is to the average width of the upstream surface.

Preferably, the smallest distance between the upstream surface 2 and the covering surface 7 is less than 1 mm, more preferably less than 0.5 mm. It is most preferred that the covering surface 7 approaches or touches the upstream surface, such that the smallest distance between the upstream surface 2 and the covering surface 7 is substantially zero.

Reference herein to a catalyst bed is to a fixed arrangement of catalyst, such as a fixed bed of catalyst particles, a metal or ceramic monolithic structure provided with catalytically active material, or an arrangement of metal wires or gauzes provided with catalytically active material.

Preferably, the catalyst bed is suitable for the partial oxidation of a hydrocarbonaceous fuel. Catalytic partial oxidation processes and suitable catalysts therefore are known in the art, for example from U.S. Pat. No. 5,149,464, EP 576 096, EP 629 578, WO 99/37580 and WO 99/19249 which are hereby incorporated by reference. Such catalysts generally comprise, as catalytically active component, a metal selected from Group VIII of the Periodic Table of the Elements. Catalysts comprising, as the catalytically active component, a metal selected from rhodium, iridium, palladium and platinum are preferred. Catalysts comprising rhodium and/or iridium are most preferred.

The catalytically active metal is most suitably supported on a carrier, such as refractory oxide particles, monolith structures, or metallic arrangements such as metal gauzes or arrangements of metal wires. Suitable carrier materials are well known in the art and include refractory oxides, such as silica, alumina, titania, zirconia and mixtures thereof, and metals, such as aluminium-containing high-temperature resistant alloys.

Typically, the partial oxidation catalyst comprises the active metal in an amount in the range of from 0.01 to 20% by weight, based on the weight of carrier material, preferably from 0.02 to 10% by weight, more preferably from 0.1 to 7.5% by weight.

In a specific embodiment of the reactor according to the invention, the reactor comprises, in addition to a partial oxidation catalyst bed as hereinbefore defined, a catalytic reaction zone for the water-gas shift conversion of the effluent of the partial oxidation catalyst bed. Optionally, the reactor further comprises a zone for the catalytic selective oxidation of the remaining carbon monoxide in the effluent of the catalytic reaction zone for the water-gas shift conversion.

Such a reactor comprising in series a partial oxidation catalyst bed, a catalytic water-gas shift reaction zone and, optionally, a zone for the catalytic selective oxidation of carbon monoxide may be advantageously applied for converting a hydrocarbonaceous fuel into a hydrogen-rich gas to be further processed in a fuel cell.

The invention further relates to a fuel cell system comprising the reactor as hereinbefore defined, wherein the catalyst bed is a catalyst bed for the partial oxidation and a hydrocarbonaceous fuel. The reactor of the fuel cell system according to the invention may additionally comprise a catalytic water-gas shift reaction zone and, optionally, a zone for the catalytic selective oxidation of carbon monoxide as hereinbefore described. The fuel cell system according to the invention may further comprise a catalytic after burner for combusting the effluent gases from the fuel cell.

Since the shape of the distribution chamber is such that re-circulation of the feed mixture is minimised, the reactor according to the invention is particularly suitable for those processes wherein reactants that form a mixture that is susceptible to ignition and explosion have to be mixed prior to contacting them with the catalyst bed. This is for example the case in the catalytic oxidation of a hydrocarbonaceous fuel.

Accordingly, the present invention also relates to a process for the oxidation of a hydrocarbonaceous fuel, using the reactor as hereinbefore defined. Preferably, the process is a process for the catalytic partial oxidation of a hydrocarbonaceous fuel.

Catalytic partial oxidation processes are typically carried out by contacting a feed mixture comprising a hydrocarbonaceous fuel and an oxygen-containing gas with a suitable catalyst, preferably in amounts giving an oxygen/carbon ratio in the range of from 0.3 to 0.8, more preferably of from 0.45 to 0.75, even more preferably of from 0.45 to 0.65. References herein to oxygen/carbon ratio are to the ratio of oxygen in the form of molecules $O_2$ to carbon present in the fuel.

The feed mixture may comprise steam and/or carbon dioxide. If steam is present in the feed mixture, the steam/carbon ratio, i.e. the ratio of molecules of steam ($H_2O$) to carbon in the fuel, is preferably in the range of from above 0.0 to 3.0, more preferably of from above 0.0 to 2.0.

The hydrocarbonaceous fuel may comprise hydrocarbons and/or oxygenates which are gaseous at the temperature and pressure prevailing in the catalyst bed during normal operation of the catalytic partial oxidation process. Particular suitable fuels comprise hydrocarbons which are gaseous or liquid under standard conditions of temperature and pressure (STP, i.e. at 0° C. and 1 atmosphere), such as natural gas, naphtha, kerosene, or gas oil. Reference herein to oxygenates is to molecules containing, apart from carbon and hydrogen atoms, at least one oxygen atom which is linked to either one or two carbon atoms or to a carbon atom and a hydrogen atom, such as alcohols, ethers, acids and esters.

Reference herein to an oxygen-containing gas is to a gas containing molecular oxygen, for example air, substantially pure oxygen or oxygen-enriched air. The oxygen-containing gas preferably is air.

The temperature prevailing in a catalytic partial oxidation process is typically in the range of from 750 to 1500° C., preferably of from 800 to 1350° C., more preferably of from 850 to 1300° C. Reference herein to temperature is to the temperature in the upstream layer of the catalyst bed.

The catalytic partial oxidation process is typically operated at a pressure in the range of from 1 to 100 bar (absolute), preferably in the range of from 1 to 50 bar (absolute), more preferably of from 1 to 10 bar (absolute).

The feed mixture is preferably contacted with the catalyst bed at gas hourly space velocities which are in the range of from 10,000 to 10,000,000 Nl/kg/h, more preferably in the range from 20,000 to 5,000,000 Nl/kg/h, even more preferably in the range of from 50,000 to 3,000,000 Nl/kg/h. Reference herein to normal litres is to litres at STP.

The invention will now be further illustrated by means of the following example.

EXAMPLE

A stream of natural gas (240 g/h) was mixed with a stream of air (930 g/h) in a reactor as shown in FIG. 3. The diameter of the upstream surface of catalyst bed 1 was 80 mm and the height of distribution chamber 3 at outer perimeter 18 was 5 mm. Both streams were pre-heated to give a temperature between 350 and 400° C. at inlet 10. The mixture was contacted with the catalyst bed 1 and converted into a mixture comprising carbon monoxide and hydrogen. The operating pressure was 1 bar (absolute). The temperature at the wall of mixing channel 8 at the location indicated with T was measured by means of a thermocouple. The measured temperature was 600° C. No ignition or explosion occurred.

The catalyst bed 1 was a 65 ppi (pores per inch) foam of zirconia partially-stabilised with yttria(Y-PSZ) provided with 2.5 wt % Rh, 2.5 wt % Ir, and 7 wt % Zr based on the total weight of catalyst by impregnating the foam with an aqueous solution comprising rhodium trichloride, iridium tetrachloride and zirconyl nitrate, followed by drying and calcining.

We claim:

1. A process for the catalytic oxidation of a hydrocarbonaceous fuel, comprising:
   contacting the fuel and an oxygen-containing gas in a reactor comprising:
   a catalyst bed comprising:
      a central longitudinal axis; and,
      an upstream surface perpendicular to the central longitudinal axis; and,
   a distribution chamber for directing a gaseous mixture of reactants to the upstream surface of the catalyst bed, which chamber comprises:
      an inlet for tangentially introducing the mixture into the distribution chamber;
      a surface defined by the upstream surface of the catalyst bed;
      a side surface having a central longitudinal axis that coincides with the central longitudinal axis of the catalyst bed; and,
      a covering surface formed such that the distance between the upstream surface of the catalyst bed and the covering surface is monotonically decreasing towards the central longitudinal axis.

2. A process for the catalytic oxidation of a hydrocarbonaceous fuel, comprising:
   contacting the fuel and an oxygen-containing gas in a reactor comprising:
   an annular catalyst bed comprising:
      a central longitudinal axis; and,
      an upstream surface perpendicular to the central longitudinal axis; and,
   an annular distribution chamber for directing a gaseous mixture of reactants to the upstream surface of the catalyst bed, which chamber comprises:
      an inlet for tangentially introducing the mixture into the distribution chamber;
      a surface defined by the upstream surface of the catalyst bed;
      a side surface having a central longitudinal axis that coincides with the central longitudinal axis of the catalyst bed; and,
      a covering surface formed such that the distance between the upstream surface of the catalyst bed and the covering surface is constant.

3. A reactor comprising:
   a catalyst bed comprising
      a central longitudinal axis,
      an upstream surface perpendicular to the central longitudinal axis; and,
   a distribution chamber for directing a gaseous mixture of reactants to the upstream surface of the catalyst bed, which chamber comprises:

an inlet for tangentially introducing the mixture into the distribution chamber;

a surface defined by the upstream surface of the catalyst bed;

a side surface having a central longitudinal axis that coincides with the central longitudinal axis of the catalyst bed; and, a covering surface formed such that the distance between the upstream surface of the catalyst bed and the covering surface is monotonically decreasing towards the central longitudinal axis.

4. The reactor of claim 3, wherein at least part of the covering surface comprises a conical shape comprising a cone half-angle.

5. The reactor of claim 4, wherein the cone half angle of the covering surface is at least 45°.

6. The reactor of claim 3, wherein the catalyst bed comprises an annular catalyst bed.

7. The reactor of claim 6, wherein at least part of the covering surface comprises a frusto-conical shape.

8. The reactor of claim 6, further comprising a conduit for removal of effluent of the catalyst bed, wherein the annular catalyst bed is arranged around the conduit.

9. The reactor of claim 3, wherein the smallest distance between the upstream surface and the covering surface is less than 1 mm.

10. The reactor of claim 3, further comprising a spiral mixing channel for mixing reactants to obtain the gaseous mixture of reactants, having an inlet for the reactants and an outlet, wherein the outlet of the mixing channel is in fluid communication with the inlet of the distribution chamber.

11. The reactor of claim 3, further comprising a ratio between the diameter of the upstream surface and the largest distance between the upstream surface and the covering surface of at least 5.

12. The reactor of claim 3, further comprising an inlet channel for supplying part of the mixture of reactants to the upstream surface of the catalyst bed, the inlet channel comprising an outlet opening into the covering surface.

13. The reactor of claim 12, wherein the inlet channel contains an igniter.

14. The reactor of claim 1, wherein the catalyst bed comprises a catalyst for the partial oxidation of a hydrocarbonaceous fuel.

15. The reactor of claim 14, further comprising a catalytic reaction zone for water-gas shift conversion of effluent of the catalyst bed and, optionally, a catalytic reaction zone for selective oxidation of carbon monoxide in the effluent of the catalytic reaction zone for water-gas shift conversion.

16. A fuel cell system comprising the reactor of claim 14 and a fuel cell.

17. A reactor comprising:

an annular catalyst bed comprising:

a central longitudinal axis; and, an upstream surface perpendicular to the central longitudinal axis; and, an annular distribution chamber for directing a gaseous mixture of reactants to the upstream surface of the catalyst bed, which chamber comprises:

an inlet for tangentially introducing the mixture into the distribution chamber;

a surface defined by the upstream surface of the catalyst bed;

a side surface having a central longitudinal axis that coincides with the central longitudinal axis of the catalyst bed; and, a covering surface formed such that the distance between the upstream surface of the catalyst bed and the covering surface is constant.

18. The reactor of claim 17, further comprising a conduit for removal of effluent of the catalyst bed, wherein the annular catalyst bed is arranged around the conduit.

19. The reactor of claim 17, further comprising a spiral mixing channel for mixing reactants to obtain the gaseous mixture of reactants, having an inlet for the reactants and an outlet, wherein the outlet of the mixing channel is in fluid communication with the inlet of the distribution chamber.

20. The reactor of claim 17, further comprising an inlet channel for supplying part of the mixture of reactants to the upstream surface of the catalyst bed, the inlet channel comprising an outlet opening into the covering surface.

21. The reactor of claim 20, wherein the inlet channel contains an igniter.

22. The reactor of claim 17, wherein the catalyst bed comprises a catalyst for the partial oxidation of a hydrocarbonaceous fuel.

23. The reactor of claim 22, further comprising a catalytic reaction zone for water-gas shift conversion of effluent of the catalyst bed and, optionally, a catalytic reaction zone for selective oxidation of carbon monoxide in the effluent of the catalytic reaction zone for water-gas shift conversion.

24. A fuel cell system comprising the reactor of claim 22 and a fuel cell.

* * * * *